3,012,001
COMPOSITION OF VINYL CHLORIDE POLYMER PLUS TWO UNSATURATED MONOMERS
Wendell V. Smith, Nutley, N.J., assignor to United States Rubber Company, New York, N.Y., a corporation of New Jersey
No Drawing. Filed Mar. 6, 1957, Ser. No. 644,223
7 Claims. (Cl. 260—45.5)

This invention relates to improvements in vinyl chloride polymer compositions.

Recent advances in the field of radiation chemistry and atomic energy have shown the need for materials which may be used as wire insulation, tubing, gaskets, etc., in equipment which is located in areas of high radiation flux, such as near X-ray apparatus, atomic reactors, etc., and which will not become discolored by exposure to such radiation, and which will not lose desirable physical properties when exposed to such radiation. It is the aim of this invention to produce such improved materials.

Accordingly, the present invention comprises introducing a monomeric ester of an alpha-unsaturated dicarboxylic acid and monomeric vinylidene compound into a vinyl chloride polymer.

All varieties and grades of resinous polymers consisting of polymerized vinyl chloride or of polymerized vinyl chloride and minor quantities of copolymerizable vinyl monomers may be used in the practice of this invention. The choice will depend upon the processing conditions employed and the properties desired in the finished product. Mixtures of two or more vinyl chloride polymers or copolymers may also be used.

A large number of esters of alpha-unsaturated dicarboxylic acids are applicable to this invention. The alcohol radicals of such esters may consist of branched or normal alkyl radicals having one to eighteen carbon atoms. Among the suitable materials are the alkyl esters of the following alpha-unsaturated dicarboxylic acids: maleic acid, fumaric acid, itaconic acid, citraconic acid, mesaconic acid, and methylene malonic acid. At least one ester of such acids is used in this invention. The preferred material is di-2-ethylhexyl maleate.

The preferred different third ingredient of this invention is styrene. Other suitable monomeric vinylidene compounds include alpha-methylstyrene, divinylbenzene, vinyltoluene, monochlorostyrene, dichlorostyrene, and vinylnaphthalene.

The compositions of this invention are useful in two forms. The first form, in which the monomeric ester and, for example, monomeric styrene are added to and mixed with the polymerized vinyl chloride, with no further treatment, finds use where the maximum of resistance to the effects of ionizing radiation must be obtained. In this instance, the two monomers are not combined with the polymerized vinyl chloride, but are merely absorbed in the polymer and act in effect to plasticize the polymer. Subsequent exposure to ionizing radiation, either as a result of its exposure during use, or intentional exposure for the purpose of modification, results in internal modification of the mixture. The three ingredients are bound together by cross-linkages produced by the action of the ionizing radiation on the mixture. This second, cross-linked, form of the material of this invention shows increased hardness, increased modulus, increased tensile strength, and increased resistance to solvents. At the same time, there is only a limited amount of discoloration resulting from the exposure to ionizing radiation.

The first form of the material is usable where production of finished articles possessing great resistance to degradation or discoloration from ionizing radiation is required. A limitation on its use in this form lies in the fact that the styrene is not chemically combined, and there is as a result, an odor of styrene to the material. In this form, the material is relatively soft and moldable. It is therefore possible to mold or otherwise shape the material into the desired useful form, and modify the soft material with ionizing radiation into the more rigid second form which will retain permanently the shape given to it. This method of fabricating finished articles is of particular interest when the vinyl chloride polymer used is a copolymer of 96–85% vinyl chloride and 4–15% vinyl acetate. When a mixture of this copolymer, di-2-ethylhexyl maleate, and styrene is exposed to ionizing radiation, it undergoes an unexpectedly large increase in hardness and modulus. By this method, it is possible to produce hard and rigid end products from raw materials which are easily handled by methods used in the plastics industry, i.e., molding, extrusion, slush-casting, etc.

The second, cross-linked form of the material has a more general utility, since it possesses the advantage of the first form, namely, resistance to discoloration on exposure to ionizing radiation, and it also has the increased physical properties obtained through the cross-linking step. Further, the styrene component is chemically combined in the material, making it useful in applications where the first form could not be used due to the presence of the styrene odor.

The improvements resulting from cross-linking the materials are found in the increased high temperature tensile strength, and the increased resistance to solvents.

Ionizing radiation suitable for performing this cross-linking operation is radiation which, when absorbed by matter, produces ionization. Examples include X-rays, gamma-rays, high speed electrons, high speed charged particles (protons, alpha particles, etc.), and high speed neutrons. Of these, X-rays, gamma-rays, and high speed electrons are particularly suitable. In the work on this invention, exposure to ionizing radiation was accomplished by passing materials to be tested through the beam of high speed electrons (2 million volts) obtained from a Van de Graaff accelerator, and also by placing materials in an X-ray field.

Mixing of the ingredients of the material of this invention may be accomplished in many ways. The method found most convenient was to simply stir the ingredients together in a "Hobart" mixer. Other means could be employed such as a dough mixer, Banbury, or other similar device. Open mill mixing is not suitable when styrene is one of the ingredients, since this monomer is too volatile at the temperature at which vinyl chloride polymers are mixed. However, if substituted styrene monomers, such as those listed above which are of lower volatility, are used, open mill mixing will be suitable. The mixture should be free of peroxidic catalysts; they cause polymerization of the vinylidene monomer such as styrene and thus render the styrene ineffective in preventing discoloration and promoting cross-linking by ionizing radiation.

The material of this invention may be fabricated in any way of the ways known to the art. Transfer molding, extruding, casting, dipping, or other means of fabrication applicable to plasticized vinyl chloride compositions may be used. In the examples cited below, molding between heated platens of a hydraulic press are used.

The relative amounts, by weight, of vinyl chloride polymer, ester of alpha-unsaturated dicarboxylic acid, and styrene or the like may be adjusted according to the hardness and stiffness desired in the final cross-linked product. The total parts of the other ingredients to 100 parts of vinyl chloride polymer may range from 25 to 100, that is, 20–50% based on the total weight, and the molal ratio of styrene or the like to ester of alpha-unsaturated dicarboxylic acid may range from 0.5 to 3.0. These molal ratios correspond to the weight ratios of 0.35 to 2 in the case of styrene with dimethyl maleate and to weight ratios of 0.085 to 0.5 in the case of styrene with dioctodecyl maleate. The preferred composition is composed of 100 parts of vinyl chloride polymer with 50 parts of the mixture of the other two ingredients, such mixture being composed of 30 parts of di-2-ethylhexyl maleate and 20 parts of styrene.

With respect to the amount of ionizing radiation to be used in converting to the cross-linked form of the composition of this invention, the lower limit is determined by that amount which is required to make the first noticeable change in physical properties, as evidence of cross-linkages being formed. Such evidence of cross-linking, or of chemical combination of the other two ingredients with the vinyl chloride polymer, may best be found by examining the total combined chlorine in the resulting polymer after extraction of uncombined material. As cross-linking takes place, the percentage of total combined chlorine will decrease, due to the incorporation of non-chlorine containing compounds. A substantial decrease in combined chlorine has been found to occur as a result of a radiation dose corresponding to the absorption of 4 watt hours of energy per pound of material. This has been selected as the lower limit of radiation required. At dosages of less than 4 watt hours/pound, cross-linking is taking place, but to a limited extent and having very little effect on the physical properties of the material. The upper limit of radiation dose can be determined by the amount of discoloration taking place upon exposure to ionizing radiation. Measurement of relative light transmission values was selected as the method of measurement of the amount of discoloration. By this method it was determined that the first appreciable changes in color occur at a dosage of 40 watt hours/pound. In comparison, conventionally formulated vinyl chloride polymers show a steady increase in discoloration, until at 40 watt hours/pound, the compositions are nearly opaque, and show severe discoloration. The amount of ionizing radiation to be used in the practice of this invention is therefore set at 4–40 watt hours/pound.

Other ingredients such as fillers, plasticizers, coloring agents, etc., may be added to the polymers of this invention as in the polymers of the prior art. In the claims appended hereto, the term "comprising essentially" is intended to mean that the composition consists solely of the materials recited therein except for the addition of such inert materials not essential thereto such as fillers, coloring agents, plasticizers and the like. This definition is intended to specifically exclude the presence of any and all peroxide polymerization catalysts as well as of monomers and polymers not of the classes set forth herein.

EXAMPLE 1

The example illustrates the advantages obtained when using the materials as given in this invention for the compounding of the vinyl chloride polymer, as compared to conventionally formulated vinyl chloride polymers.

All ingredients were thoroughly blended in a "Hobart" mixer, and then molded into pieces suitable for testing (6.5" x 6.5" x 0.1") in a platen press at a temperature of 320° F. These test pieces were then irradiated with high speed electrons (2 million volts) from a Van de Graaff accelerator. The dose, or amount of energy supplied to the material, was controlled by variation of the time the material was allowed to remain in the electron beam, and has been estimated in watt hours of energy received per pound of material.

The irradiated materials were then tested by standard methods of testing rubbers and plastics, with results as listed in Table I below.

*Table I*

|  | "A" | "B" | "C" | "D" |
|---|---|---|---|---|
| Polyvinyl chloride (parts) | 100 | 100 | 100 | 100 |
| Dioctyl phthalate (parts) | 50 | 30 | | |
| Di-2-ethylhexyl maleate (parts) | | | 50 | 30 |
| Styrene (parts) | | 20 | | 20 |
| Properties Before Irradiation: | | | | |
| Relative light transmission, percent | 77 | 75 | 90 | 84 |
| Combined chlorine, percent | 55.1 | 54.6 | 55.3 | 55.2 |
| Solubility in THF | sol. | sol. | sol. | sol. |
| Tensile strength at 72° F. (p.s.i.) | 2,620 | 2,870 | 2,340 | 2,680 |
| Tensile strength at 260° F. (p.s.i.) | 130 | 143 | 127 | 139 |
| Properties After Irradiation at 20 Watt Hours Per Pound: | | | | |
| Relative light transmission, percent | 19 | 16 | 30 | 76 |
| Combined chlorine, percent | 54.5 | 53.6 | 52.3 | 47.5 |
| Solubility in THF | sol. | insol. | sol. | insol. |
| Tensile strength at 72° F. (p.s.i.) | 2,230 | 3,140 | 2,420 | 2,950 |
| Tensile strength at 260° F. (p.s.i.) | 94 | 162 | 138 | 240 |

Examination of the results given in Table I shows the following:

(1) The relative light transmission of the material prepared according to this invention ("D") was substantially unchanged by the action of the radiation, while conventionally compounded materials show a large reduction. This demonstrates the improved resistance to discoloration due to the action of ionizing radiation that the material of this invention possesses.

(2) The percent combined chlorine of the conventional material is slightly reduced by the ionizing radiation. This reduction may be attributed in a minor part to cross-linking, the major part of the reduction being caused by actual loss of chlorine due to the destructive effect of ionizing radiation on an unprotected composition. In contrast, the much greater reduction in the combined chlorine, in the example of the material of this invention ("D"), is almost wholly due to the cross-linking of the three ingredients.

(3) Further indication that cross-linking has occurred is found in the solubility or insolubility of the material in the tetrahydrofuran (abbreviated THF above). Cross-linked materials will be found to be insoluble in tetrahydrofuran.

(4) Tensile properties measured at room temperature show a slight decrease for irradiated conventional compositions, and a slight increase for irradiated compositions of this invention. Tensile properties measured at 260° F. show a striking increase after irradiation in compositions of this invention ("D" above) as compared to the conventional material ("A" above).

(5) Included as a part of this example are samples containing conventional plasticizer ("A"), conventional plasticizer and one of the materials used in this invention ("B"), and a sample containing one of the materials of this invention alone ("C"). Only the sample containing the preferred embodiment of this invention ("D") shows consistent improvement in all properties, indicating that it is a combination of the three ingredients that is effective, rather than any single ingredient.

Other materials as listed in the details of this invention may be substituted for the polyvinyl chloride, the di-2-ethylhexyl maleate, or the styrene used above, and similar improvements in physical properties and in resistance to discoloration will be obtained. Also, the ratio of ester of alpha-unsaturated dicarboxylic acid to styrene or the like may be varied over the range previously given with similar improvements.

EXAMPLE 2

The specific and unique behavior of vinyl chloride-vinyl acetate copolymers compounded with dioctyl maleate and styrene and subsequently subjected to ionizing radiation is shown in Example 2 where a 4% acetate copolymer and a 13% acetate copolymer are used. Procedure used is the same as in Example 1. Results are tabulated in Table II. In the case of "F" and "H," the effect of irradiation was to transform the ordinarily soft plastic composition into a hard and rigid material. This effect can be shown by comparison of examples "G" and "H," noting especially the increase of hardness and torsional modulus after irradiation.

*Table II*

| Component (parts) | "E" | "F" | "G" | "H" |
|---|---|---|---|---|
| "Vinylite" VYNW: | | | | |
| 96% vinyl chloride | | | 100 | 100 |
| 4% vinyl acetate | | | | |
| "Vinylite" VYHH: | | | | |
| 87% vinyl chloride | 100 | 100 | | |
| 13% vinyl acetate | | | | |
| Dioctyl phthalate | 50 | | 45 | |
| Dioctyl maleate | | 30 | | 28 |
| Styrene | | 20 | | 17 |
| Properties Before Irradiation: | | | | |
| Relative light transmission, percent | | | 50 | 90 |
| Shore A hardness | 60 | 52 | 79 | 73 |
| Solubility in THF | sol. | sol. | sol. | sol. |
| Torsional modulus at 72° F | | | 2,540 | 4,700 |
| Torsional hysteresis at 280° F | soft [1] | soft [1] | soft [1] | soft [1] |
| Tensile strength at 72° F. (p.s.i.) | 850 | 839 | 2,470 | 2,660 |
| Tensile strength at 220° F. (p.s.i.) | | | 310 | 346 |
| Tensile strength at 260° F. (p.s.i.) | 0 | 0 | 125 | 99 |
| Properties After Irradiation at 20 Watt Hours per Pound: | | | | |
| Relative light transmission, percent | dark | light | 12 | 70 |
| Shore A hardness | 60 | 92 | 79 | 95 |
| Solubility in THF | sol. | insol. | sol. | insol. |
| Torsional modulus at 72° F | | | 2,800 | 49,500 |
| Torsional hysteresis at 280° F | soft [1] | brittle [1] | soft [1] | .1531 |
| Tensile strength at 72° F. (p.s.i.) | 820 | 1,087 | 2,550 | 3,100 |
| Tensile strength at 220° F. (p.s.i.) | | | 282 | 645 |
| Tensile strength at 260° F. (p.s.i.) | 0 | hard [1] | 101 | 326 |

[1] Outside numerical range of test.

EXAMPLE 3

This example illustrates the fact that X-rays are as effective as high speed electrons in promoting the cross-linking of this unique composition.

A composition consisting of 100 parts by weight of VYNW (a commercial vinyl chloride-vinyl acetate copolymer), 30 parts di-2-ethylhexyl maleate and 20 parts styrene were mixed and molded into a slab 3 inches by 5 inches by 1/10 of an inch by heating in a press for 5 minutes at 350° F. The hardness of the slab was measured with a Shore D durometer and found to be 40. It was soluble in tetrahydrofurane.

After treatment with $7.5 \times 10^6$ roentgens in an X-ray field the Shore D hardness had increased to 63 and the sample was no longer soluble in tetrahydrofurane. A dose of $10^6$ roentgens corresponds approximately to the absorption of 1 watt hour of energy per pound of material. A corresponding treatment with $10 \times 10^6$ roentgens supplied by 2 million volt electrons gave a sample with Shore D hardness of 54 which also was insoluble.

Having thus described my invention, what I claim and desire to protect by Letters Patent is:

1. A composition comprising essentially (a) a vinyl chloride polymer, (b) a monomeric ester of an alpha-unsaturated dicarboxylic acid with a monomeric alcohol having from one to eighteen carbon atoms, and (c) a monomeric vinylidene compound from the group consisting of styrene, alpha-methylstyrene, divinylbenzene, vinyltoluene, monochlorostyrene, dichlorostyrene, and vinylnaphthalene, said monomeric components constituting from about 20% to about 50% by weight of the sum of the weights of the monomers and the vinyl chloride polymer, and wherein the molal ratio of the monomeric vinylidene compound to the said monomeric ester is in the range from about 0.5 to about 3.0, said composition existing in the solid state.

2. A composition as in claim 1 wherein the said dicarboxylic acid is selected from the group consisting of maleic, fumaric, itaconic, citraconic, methylenemalonic and mesaconic acids.

3. A composition as in claim 1 wherein the said monomeric vinylidene compound is styrene.

4. A composition as in claim 2 wherein the said monomeric vinylidene compound is styrene.

5. A composition as in claim 1 wherein the said ester is an alkyl ester of maleic acid with an alcohol having from one to eighteen carbon atoms.

6. A composition as in claim 5 wherein the said monomeric vinylidene compound is styrene.

7. A composition as in claim 6 wherein the said vinyl chloride polymer is a copolymer of vinyl chloride and vinyl acetate.

References Cited in the file of this patent

UNITED STATES PATENTS

| | | |
|---|---|---|
| 2,155,590 | Garvey | Apr. 25, 1939 |
| 2,430,109 | D'Alelio | Nov. 4, 1947 |
| 2,562,897 | Ellingboe | Aug. 7, 1951 |
| 2,614,089 | Harrison et al. | Oct. 14, 1952 |
| 2,666,025 | Nozaki | Jan. 12, 1954 |
| 2,746,944 | Naps et al. | May 22, 1956 |
| 2,763,609 | Lewis et al. | Sept. 18, 1956 |
| 2,843,562 | Caldwell | July 15, 1958 |
| 2,878,174 | Rainer et al. | Mar. 17, 1959 |

FOREIGN PATENTS

| | | |
|---|---|---|
| 1,130,099 | France | Jan. 30, 1957 |
| 1,130,100 | France | Jan. 30, 1957 |

OTHER REFERENCES

Sun: "Modern Plastics," September 1954, pages 141–144, 146, 148, 150, 229–233, 236, 238.

Abstract of application, 781,326, O.G. volume 656, page 889, March 18, 1952.

B.N.L. 375, A.E.C., cover ii, page 26, April 1956.